US012804240B2

(12) United States Patent
Hall

(10) Patent No.: US 12,804,240 B2
(45) **Date of Patent: *Nov. 17, 2026**

(54) SYSTEMS AND METHODS FOR PROVIDING VIDEO ENHANCEMENT FOR SPORTING EVENTS

(71) Applicant: SportsMEDIA Technology Corporation, Durham, NC (US)

(72) Inventor: Gerard J. Hall, Durham, NC (US)

(73) Assignee: SportsMEDIA Technology Corporation, Durham, NC (US)

( * ) Notice: Subject to any disclaimer, the term of this patent is extended or adjusted under 35 U.S.C. 154(b) by 25 days.

This patent is subject to a terminal disclaimer.

(21) Appl. No.: 19/005,129

(22) Filed: Dec. 30, 2024

(65) Prior Publication Data

US 2025/0133272 A1 Apr. 24, 2025

Related U.S. Application Data

(63) Continuation of application No. 18/583,324, filed on Feb. 21, 2024, now Pat. No. 12,192,592, which is a continuation of application No. 18/095,813, filed on Jan. 11, 2023, now Pat. No. 11,917,264, which is a continuation of application No. 17/586,353, filed on Jan. 27, 2022, now Pat. No. 11,558,675, which is a continuation of application No. 16/407,722, filed on May 9, 2019, now Pat. No. 11,240,569.

(Continued)

(51) Int. Cl.

| | |
|---|---|
| ***H04N 21/81*** | (2011.01) |
| ***H04N 21/2187*** | (2011.01) |
| ***H04N 21/235*** | (2011.01) |
| ***H04N 21/431*** | (2011.01) |
| ***H04N 21/4722*** | (2011.01) |

(52) U.S. Cl.

CPC ..... *H04N 21/8133* (2013.01); *H04N 21/2187* (2013.01); *H04N 21/235* (2013.01); *H04N 21/4316* (2013.01); *H04N 21/4722* (2013.01)

(58) Field of Classification Search

None

See application file for complete search history.

(56) References Cited

U.S. PATENT DOCUMENTS

| | | | |
|---|---|---|---|
| 9,251,603 | B1 | 2/2016 | Kozko |
| 9,592,445 | B2 | 3/2017 | Smith |

(Continued)

FOREIGN PATENT DOCUMENTS

| | | | |
|---|---|---|---|
| CA | 2740109 | C | 1/2016 |
| CA | 3003526 | A1 | 11/2018 |
| WO | 0064176 | A1 | 10/2000 |

*Primary Examiner* — James R Marandi

(74) *Attorney, Agent, or Firm* — Neo IP

(57) ABSTRACT

Systems and methods for video presentation and analytics for a sporting event are disclosed. In one embodiment, the sporting event is an auto racing event. A server platform is provided to collect and analyze real-time raw data and historical raw data, and compare drivers/vehicles from a current auto racing event and/or a historical auto racing event. The server platform is operable to overlay a ghost driver/vehicle on the images of a driver/vehicle in the current auto racing event based on the comparison. The server platform also provides a GUI for displaying the current auto racing event with enhanced features.

20 Claims, 11 Drawing Sheets

Related U.S. Application Data

(60) Provisional application No. 62/670,005, filed on May 11, 2018.

(56) References Cited

U.S. PATENT DOCUMENTS

| | | | | |
|---|---|---|---|---|
| 10,478,730 | B1 | 11/2019 | Burnett | |
| 2004/0224740 | A1 | 11/2004 | Ball et al. | |
| 2009/0262137 | A1 | 10/2009 | Walker et al. | |
| 2010/0026809 | A1 | 2/2010 | Curry | |
| 2010/0271367 | A1 | 10/2010 | Vaden et al. | |
| 2011/0081965 | A1* | 4/2011 | Klein | A63F 13/12 463/31 |
| 2014/0331253 | A1 | 11/2014 | Allen et al. | |
| 2016/0045828 | A1 | 2/2016 | Bowron | |
| 2017/0238055 | A1 | 8/2017 | Chang et al. | |
| 2019/0262705 | A1 | 8/2019 | Trombetta et al. | |
| 2019/0349647 | A1 | 11/2019 | Hall | |
| 2022/0150600 | A1 | 5/2022 | Hall | |
| 2023/0188809 | A1 | 6/2023 | Hall | |
| 2024/0236442 | A1 | 7/2024 | Hall | |

* cited by examiner

FIG. 3
Race Status
Since Lap 0
Free
Bird's Eye View
Chase
Front
Rear
Side
Top
Broadcast
CAM1
Rank 1 1
Time off (s) 0.000 0.000
Speed (MPH) 79.745 80.55
Throttle 99% 99%
Brake 1% 0%
Steering Angle 0° 1°
RPM 6959 7053
Driver
Ghost
Lap Fraction 22.705 22.711
Recent Laps
Lap or offset
-5
Driving Lines
Race 661.684s
Lap 30
rewind
1/2x
1x
2x
L

SYSTEMS AND METHODS FOR PROVIDING VIDEO ENHANCEMENT FOR SPORTING EVENTS

CROSS-REFERENCE TO RELATED APPLICATIONS

This application relates to and claims priority from the following U.S. Applications. This application is a continuation of U.S. patent application Ser. No. 18/583,324, filed Feb. 21, 2024, which is a continuation of U.S. patent application Ser. No. 18/095,813, filed Jan. 11, 2023 and issued as U.S. Pat. No. 11,917,264, which is a continuation of U.S. patent application Ser. No. 17/586,353, filed Jan. 27, 2022 and issued as U.S. Pat. No. 11,558,675, which is a continuation of U.S. patent application Ser. No. 16/407,722, filed May 9, 2019 and issued as U.S. Pat. No. 11,240,569, which claims priority from U.S. Provisional Patent Application No. 62/670,005, filed May 11, 2018, each of which is incorporated herein by reference in its entirety.

BACKGROUND OF THE INVENTION

1. Field of the Invention

The present invention relates to systems and methods for providing video enhancement for sporting events. More particularly, the present invention relates to systems and methods for providing performance comparison in auto racing broadcasting.

2. Description of the Prior Art

Auto racing (also known as car racing, motor racing, or automobile racing) is a sport involving the racing of automobiles for competition. Some popular auto racing competitions are, for example, NASCAR, INDYCAR, FORMULA ONE, GRAND-AM, and NHRA. These auto racing competitions draw a lot of fans every season. Besides viewing an auto racing event at the track, live television broadcasting provides a convenient way for fans and viewers to enjoy the excitement of the auto racing events. NASCAR is second to the National Football League among professional sports franchises in terms of television viewers and fans in the United States. Internationally, NASCAR races are broadcast on television in over 150 countries. TV broadcasting has improved with the development of camera technologies and computer processing. However, there is little video enhancement and statistical data available during TV broadcasting or subsequent to the broadcast for analytics.

Exemplary US Patent Documents relevant to the prior art include:

US Pub. No. 2014/0331253 for "Networks, systems and methods for enhanced auto racing" by Erik Allen et al., filed Feb. 27, 2014 and published Nov. 6, 2014, describes networks, systems and displays for providing derived data and predictive information for use in multivariable component systems and activities; and in particular for use in motor racing such as in NASCAR®, Indy Car, Grand-Am (sports car racing), and/or Formula 1® racing. More particularly, there are systems equipment and networks for the monitoring and collecting of raw data regarding races, both real time and historic. This raw data is then analyzed to provide derived data, predictive data, virtual data, and combinations and variations of this data, which depending upon the nature of this data may be packaged, distributed, displayed and used in various setting and applications.

US Pub. No. 2010/0271367 for "Method and apparatus for combining a real world event and a computer simulation" by Mark Vaden et al., filed Apr. 22, 2009 and published Oct. 28, 2010, describes a method for use in a computer simulation. The method includes receiving data obtained from a real-world event that takes place over a period of time and that includes a plurality of moving bodies, wherein the data includes position data and at least one other attribute for each moving body in the plurality of moving bodies with the data being measured at a plurality of points in the period of time, generating a representation of the real-world event using the data, wherein the representation of the real-world event comprises representations of the plurality of moving bodies, and rendering the representation of the real-world event on a display. Another method includes obtaining data for each of a plurality of moving bodies in a real-world event, and providing the data to an apparatus that is configured to use the data to generate a representation of the real-world event and render the representation of the real-world event on a display. A computer readable storage medium stores a computer program adapted to cause a processor based system to execute one or more of the above or similar steps. An apparatus is configured to generate and render a representation of the real-world event using data obtained from the real-world event.

US Pub. No. 2009/0262137 for "Systems and methods for presenting prediction in a broadcast" by Jay S. Walker et al., filed Jan. 8, 2009 and published Oct. 22, 2009, describes methods and systems for presenting prediction in a broadcast. In an embodiment, the method includes receiving, by a prediction graphic generator, at least one of telemetry data, situational data, or historical data. The prediction graphic generator then determines a prediction based on at least two of the telemetry data, the situational data, or the historical data, and generates a prediction overlay based on the prediction. The prediction overlay is output to a broadcast computer, where it is combined with a live broadcast to generate an enhanced broadcast. The broadcast computer then broadcasts the enhanced broadcast.

US Pub. No. 2004/0224740 for "Simulation system" by Timothy Ball et al., filed Feb. 3, 2003 and published Nov. 11, 2004, describes a competitive simulation game comprising a base program and at least one controllable object controllable by a player, characterised in that, in use, a real time input from a real life game controls a competitive object in the competitive simulation game as a competitor to the player.

U.S. Pat. No. 9,251,603 for "Integrating panoramic video from a historic event with a video game" by Dmitry Kozko, filed Nov. 27, 2013 and issued Feb. 2, 2016, describes a panoramic video of a real world event can be received. The video can include perspective data linked with a video timeline. A perspective view associated with a graphics of a video game linked with a game timeline at a first time index can be determined. The perspective data of the panoramic video can be processed to obtain a video sequence matching the perspective view associated with the graphics at a second time index. The video timeline and the game timeline can be synchronized based on a common time index of each of the timelines. The graphics and the video sequence can be integrated into an interactive content, responsive to the synchronizing.

SUMMARY OF THE INVENTION

The present invention provides a server platform for video enhancement for auto racing events. In one embodiment, the server platform is cloud-based. The server platform collects and analyzes real-time raw data from drivers/vehicles in a current auto racing event, thereby creating analyzed data. The server platform is operable to access historical raw data and analyzed data from a previous auto racing event. In one embodiment, the raw data includes data collected from monitoring, probing, sensing, and/or tracking for a driver/vehicle in an auto racing event. The raw data further includes video image data from cameras capturing the auto racing event. The server platform is further operable to compare performances of drivers/vehicles based on the raw data and analyzed data from the current auto racing event and historical auto racing events. The server platform is further operable to process video images of the current auto racing event based on the comparison. In one embodiment, the server platform is operable to overlay/insert an image of a selected driver/vehicle as a ghost driver/vehicle in the video images of the current auto racing event along with the driver/vehicle of interest for comparison. The server platform provides at least one graphical user interface (GUI) to display the processed video images of the current auto racing event. In one embodiment, the GUI is further operable to display statistical data for the comparison of the drivers/vehicles.

These and other aspects of the present invention will become apparent to those skilled in the art after a reading of the following description of the preferred embodiment when considered with the drawings, as they support the claimed invention.

DETAILED DESCRIPTION

Figure 1:
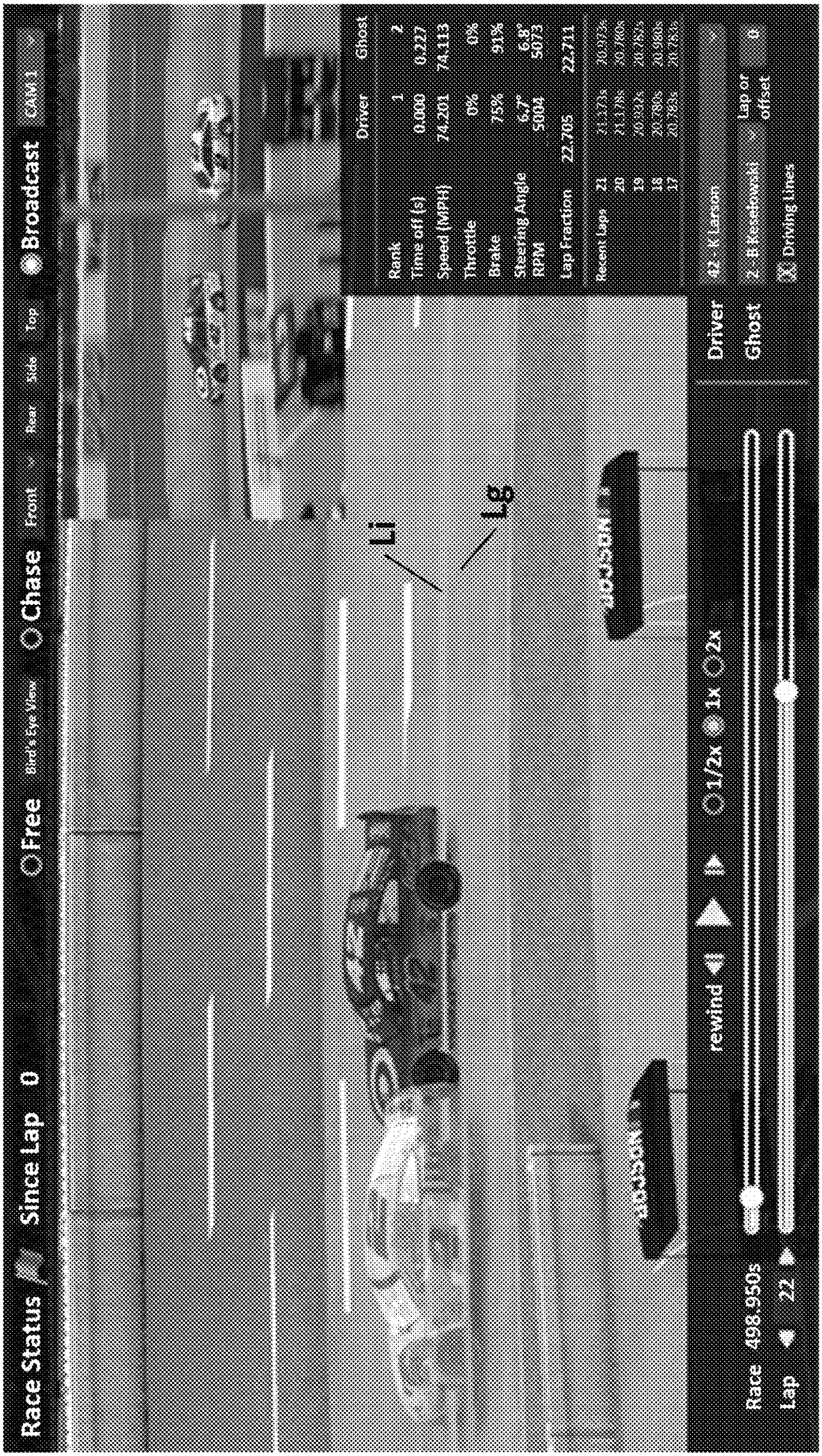
FIG. 1 displays a comparison of two drivers/vehicles in a NASCAR event at lap 22 and a live view of the two drivers/vehicles in broadcast mode according to one embodiment of the present invention.

The present invention relates to video enhancement for sporting event presentation. The present invention provides systems and methods for video enhancement for sporting event presentation. In one embodiment, the sporting event is auto racing.

Auto racing events involves racing of automobiles for competitions. For example, some of the popular auto racing events include NASCAR, INDYCAR, FORMULA ONE, GRAND-AM, and NHRA. Unlike football, basketball, and baseball, TV broadcasting for auto racing events provides little video enhancement and little data available on screen related to the performance of drivers/vehicles. Thus, viewers of auto racing events have a limited viewing experience. Accordingly, there exists a long felt and unmet need for enhancing video presentation for auto racing events and accessing more consumable data to improve broadcast presentation, viewing experience, fan engagement, after event analytics, training, etc.

The present invention provides a server platform for video enhancement for auto racing events. In one embodiment, the server platform is cloud-based. The server platform collects and analyzes real-time raw data from drivers/vehicles in a current auto racing event, thereby creating analyzed data. The server platform is operable to access historical raw data and analyzed data from a previous auto racing event. In one embodiment, the raw data includes data collected from monitoring, probing, sensing, and/or tracking a driver/vehicle in an auto racing event. The raw data further includes video image data from cameras capturing the auto racing event. The server platform is further operable to compare performances of drivers/vehicles based on the raw data and analyzed data from the current auto racing event and historical auto racing events. The server platform is further operable to process video images of the current auto racing event based on the comparison. In one embodiment, the current auto racing event is a live auto racing event. In another embodiment, the current auto racing event is a finished auto racing event of interest.

The present invention provides systems and methods of video enhancement for auto racing broadcast. A server platform is in network communication with at least one input capture device in a current auto racing event and at least one user device. The at least one input capture device is operable to collect and transmit real-time input data relating to the current auto racing event to the server platform. The server platform analyzes the real-time input data, thereby creating analyzed data. The server platform is operable to access historical data for previous auto racing events. The server platform compares driver performances in the current auto racing event and previous auto racing events based on analyzed data and historical data. The server platform overlays a graphical element representing a driver and vehicle for comparison on video images of a driver and vehicle of interest in the current auto racing event. The at least one user device is operable to display the graphical element on the video images of the driver and vehicle of interest via an interactive graphical user interface (GUI). The driver and vehicle for comparison is a ghost driver and vehicle depicted in faded color.

In one embodiment, the systems and methods of the present invention apply not only to auto racing event but also any other competitive event. A server platform is in network communication with at least one input capture device in current event and at least one user device. The at least one input capture device collects and transmits real-time input data relating to the current event to the server platform. The server platform analyzes the real-time input data, thereby creating analyzed data. The server platform is operable to access historical data for previous events stored in a database. The server platform compares element performances in the current event and previous events based on analyzed data and historical data. The server platform overlays a graphical element representing an element for comparison on video images of an element of interest in the current event. The at least one user device displays the graphical element on the video images of the driver and vehicle of interest via an interactive graphical user interface (GUI).

The server platform provides at least one graphical user interface (GUI) to display the processed video images of the current auto racing event. In one embodiment, the at least one GUI is customized for broadcasters, fans, trainers, and other parties who are interested in an auto racing event.

In one embodiment, the GUI is further operable to display statistical data for the comparison of the drivers/vehicles. For example, statistical data of a driver/vehicle in a NASCAR event includes but not limited to a rank of the driver/vehicle, a time off, a speed, a percentage of throttle, a percentage of brake, a steering angle, RPM (revolutions per minute), a lap fraction, time for recent laps, etc.

In one embodiment, raw data, analyzed data, statistical data, video data, and other data related to an auto racing event are stamped with a time code indicating when the data is captured and/or processed. In one embodiment, all the data are synchronized and stored along a timeline in a file format in a database accessible by the sever platform of the present invention. In one embodiment, the file format is annotatable. In one embodiment, the file format is applicable to all kinds of sports.

In one embodiment, the comparison of drivers/vehicles is between different drivers/vehicles in the same auto racing event. In another embodiment, the comparison is between a driver/vehicle in the current auto racing event and a driver/vehicle in a historical auto racing event. In another embodiment, the comparison is for the same driver/vehicle in the current auto racing event and in a historical auto racing event. In yet another embodiment, the comparison is for the same driver between different laps in the current auto racing event.

In one embodiment, for comparison between a current auto racing event and a historical auto racing event, the data and video images of a driver/vehicle in the historical auto racing event is synchronized or aligned with those of the current auto racing event from the beginning of the events. For example, in a live NASCAR event, a historical NASCAR event which took place on the same track is synchronized or aligned to the live NASCAR event from the starting line. In another embodiment, for comparison between different drivers/vehicles in the same auto racing event, the data for all drivers/vehicles are already synchronized along a timeline from the beginning of the same auto racing event. In yet another embodiment, for comparison of the same driver/vehicle at different laps, the data at different laps are synchronized at the starting line of each lap.

In one embodiment, a driver/vehicle is selected from a current NASCAR event or a historical NASCAR event via a GUI to compare with a driver/vehicle of interest in the current NASCAR event. The server platform is operable to overlay/insert an image of the selected driver/vehicle as a ghost driver/vehicle along with the driver/vehicle of interest in the video images of the current NASCAR event. The ghost driver/vehicle is preferably displayed in a faded/washed color. Alternative methods of differentiating the ghost driver/vehicle from the driver/vehicle of interest such as arrows, outlines, different colors, etc. are also within the scope of the present invention.

Statistical data for the ghost driver/vehicle and the driver/vehicle of interest are compared and displayed on the video images of the current NASCAR event along with the image of the ghost driver/vehicle via the GUI. In one embodiment, the ghost driver/vehicle represents a different driver/vehicle in the current NASCAR event. In one embodiment, the ghost driver/vehicle is the same driver/vehicle in a different lap in the current NASCAR event. In another embodiment, the ghost driver/vehicle is a different driver in a historical NASCAR event. In yet another embodiment, the ghost driver/vehicle is the same driver/vehicle in a historical NASCAR event.

In one embodiment, the GUI in the present invention is customized for broadcasters, trainers, fans, and other parties of a specific sporting event. For example, a GUI for a NASCAR event is operable to display video images of the NASCAR event with enhancement information for broadcasting, training and other purposes. A race status is displayed and represented by different flags used in a NASCAR event (e.g., green flag, yellow flag, red flag, black flag, blue flag with diagonal yellow stripe, white flag, and checkered flag used in NASCAR events). For example, a green flag means a NASCAR event has started or resumed. There are different modes for displaying the NASCAR event, including free mode, chase mode, and broadcast mode. In free mode, a bird's eye view of the NASCAR event is displayed. In chase mode, a front, middle, or back view of a vehicle is selected to be displayed. In broadcast mode, a camera view is selected to broadcast. An authorized user is enabled to select drivers/vehicles via the GUI for drivers/vehicles of interest and drivers/vehicles for comparison. Statistical data for selected drivers/vehicles are displayed on the GUI. The GUI is operable to display driving lines of the selected drivers/vehicles. Laps traveled and time spent by a driver/vehicle are displayed via the GUI. In one embodiment, a lap number is displayed as an integer, and the progress of a driver/vehicle of interest for the lap number is represented by the position of an indicator on a lap slider. The position of an indicator on a race slider indicates the total amount of time that has passed in the race out of the total time for the course record, the total time of the race for the ghost driver/vehicle, the total time of the race projected for the race based on the current lap time or the average lap time, and combinations thereof.

Referring now to the drawings in general, the illustrations are for the purpose of describing a preferred embodiment of the present invention and are not intended to limit the present invention thereto.

FIGS. 1-11 are screenshots for the GUI displaying a NASCAR event with video enhancement features according to one embodiment of the present invention.

FIG. 1 displays a comparison of two drivers/vehicles in a NASCAR event at lap 22 and a live view of the two drivers/vehicles in broadcast mode according to one embodiment of the present invention. No. 42 K. Larson is selected as a driver/vehicle of interest, and No. 2 B. Keselowski is selected as a ghost driver/vehicle for comparison. The main window displays a comparison of the driver/vehicle of interest and the ghost driver/vehicle. A live window at the top right corner displays the two drivers/ vehicles in the NASCAR event in broadcast mode. Advantageously, the present invention provides for comparing a driver/vehicle of interest with a ghost driver/vehicle from a variety of sources, including the ghost driver/vehicle compared to the driver/vehicle of interest on the current lap only (i.e., the ghost driver/vehicle and driver/vehicle of interest are displayed as if they started the current lap at the same time), the driver/vehicle of interest compared to a prior lap of the ghost driver/vehicle in the current race, historically, etc., and any other comparison of interest. Notably, statistics are operable to be displayed for the comparison of the ghost driver/vehicle and the driver/vehicle of interest. The lap fraction statistic indicates the lap number and a decimal portion of how much of the lap the driver/vehicle of interest and the ghost driver/vehicle have completed.

The driver/vehicle of interest No. 42 K. Larson ranks first and the ghost driver/vehicle No. 2 B. Keselowski ranks second in the same NASCAR event in the video feed displayed in FIG. 1. The driver/vehicle of interest No. 42 K. Larson has traveled 22.705 laps, and the current speed is 74.201 mph. The percentage of throttle is 0%, the percentage of brake is 75%, the steering angle is 67%, and the RPM is 5004. By comparison, the ghost driver/vehicle No. 2 B. Keselowski has traveled 22.711 laps, and the current speed is 74.113 mph. The time off with reference to the driver/vehicle of interest No. 42 K. Larson is 0.227 s. For the ghost driver/vehicle No. 2 B. Keselowski, the percentage of throttle is 0%, the percentage of brake is 91%, the steering angle is 68%, and the RPM is 5073. The RPM of the ghost driver/vehicle is much higher than that of the driver/vehicle of interest, which indicates the ghost driver/vehicle is speeding up. The driving lines for the driver/vehicle of interest and the ghost driver/vehicle are displayed as Li and Lg in FIG. 1. The driving lines indicate the trajectories of the driver/vehicle of interest and the ghost driver/vehicle. The driving line for the driver/vehicle of interest is preferably updated in real-time or near real-time based on changes in position of the driver/vehicle of interest. The time spent on the last five laps such as laps 17, 18, 19, 20 and 21 is also displayed for the driver/vehicle of interest and the ghost driver/vehicle respectively. The driving line for the driver/vehicle of interest is an average trajectory based on the prior movement of the driver/vehicle of interest in prior laps, prior races, etc. and/or an anticipated trajectory of the driver/vehicle of interest based on the current movement of the driver/vehicle of interest.

Figure 2:
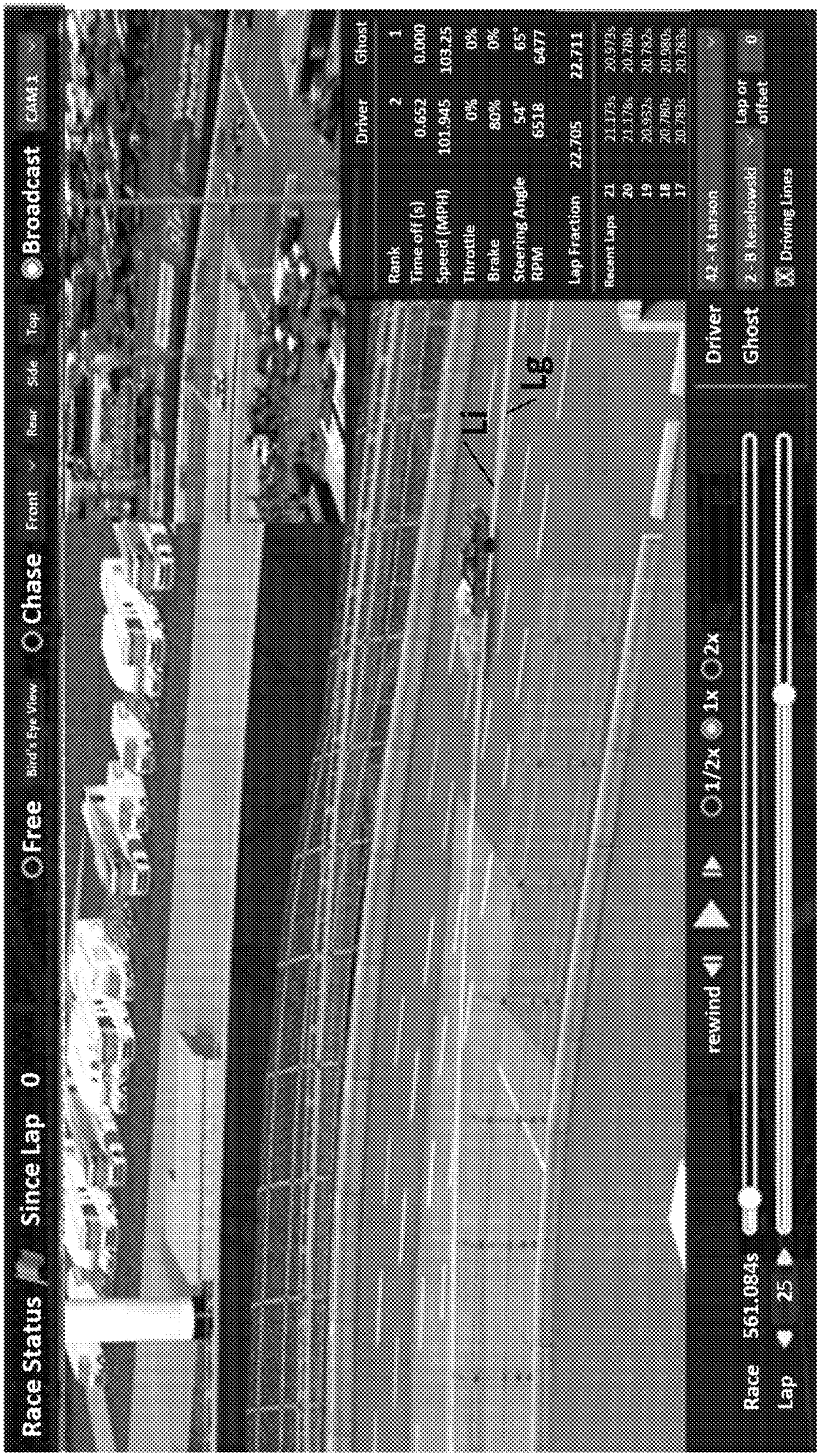
FIG. 2 displays a comparison of two drivers/vehicles in a NASCAR event at lap 25 and a live view of the two drivers/vehicles in broadcast mode according to one embodiment of the present invention.

FIG. 2 displays a comparison of a driver/vehicle of interest and a ghost driver/vehicle in a NASCAR event at lap 25 and a live view of the two drivers/vehicles in broadcast mode according to one embodiment of the present invention. The driver/vehicle of interest is No. 42 K. Larson. The ghost driver/vehicle is No. 2 B. Keselowski for comparison. The main window displays a comparison of the driver/vehicle of interest and the ghost driver/vehicle for lap 25. A live window at the top right corner displays the two drivers/vehicles in the NASCAR event in broadcast mode.

The ghost driver/vehicle No. 2 B. Keselowski ranks first and the driver/vehicle of interest No. 42 K. Larson ranks second in the same NASCAR event at the moment displayed in FIG. 2. The ghost driver/vehicle No. 2 B. Keselowski has traveled 25.630 laps, and the current speed is 103.25 mph. The percentage of throttle is 0%, the percentage of brake is 0%, the steering angle is 65° and the RPM is 6477. The driver/vehicle of interest No. 42 K. Larson has traveled 25.627 laps, and the current speed is 101.945 mph. The percentage of throttle is 0%, the percentage of brake is 80%, the steering angle is 54°, and the RPM is 6518. The time off with reference to the ghost driver/vehicle is 0.652 s. The driving line for the driver is depicted as Li and the driving line for the ghost driver is depicted as Lg in FIG. 2. The time spent on the last five laps such as laps 20, 21, 22, 23, and 24 is also displayed for the driver and the ghost driver respectively.

Figure 3:
FIG. 3 displays a comparison between a driver/vehicle at lap 30 and the same driver/vehicle at lap 25 in a NASCAR event and a live view of the driver/vehicle in broadcast mode according to one embodiment of the present invention.

FIG. 3 displays a comparison between a driver/vehicle at lap 30 and the same driver/vehicle at lap 25 in a NASCAR event and a live view of the driver/vehicle in broadcast mode according to one embodiment of the present invention. The driver/vehicle of interest and the ghost driver/vehicle are both No. 2 B. Keselowski, who ranks first at the current NASCAR event. Statistical data and video data for both laps are synchronized from the starting line of each lap. The driver/vehicle of interest in live view is at 30.392 laps, the speed is 79.745 mph, the percentage of throttle is 99%, the percentage of brake is 1%, the steering angle is 0°, and the RPM is 6959. By comparison, when the same driver/vehicle at 25.395 laps, the speed is 80.55 mph, the percentage of throttle is 99%, the percentage of brake is 0%, the steering angle is 1°, and the RPM is 7053. The driving lines are depicted as L for both the driver of interest and the ghost driver, and the relative position of the ghost driver/vehicle with reference to the position of the driver/vehicle at lap 30 is displayed in the main window of FIG. 3. Time spent for the last five laps (laps 25, 26, 27, 28, and 29) is provided for the driver/vehicle of interest at lap 30, and the time spent for recent laps 20, 21, 22, 23 and 24 is provided for the ghost driver/vehicle at lap 25.

Figure 4:
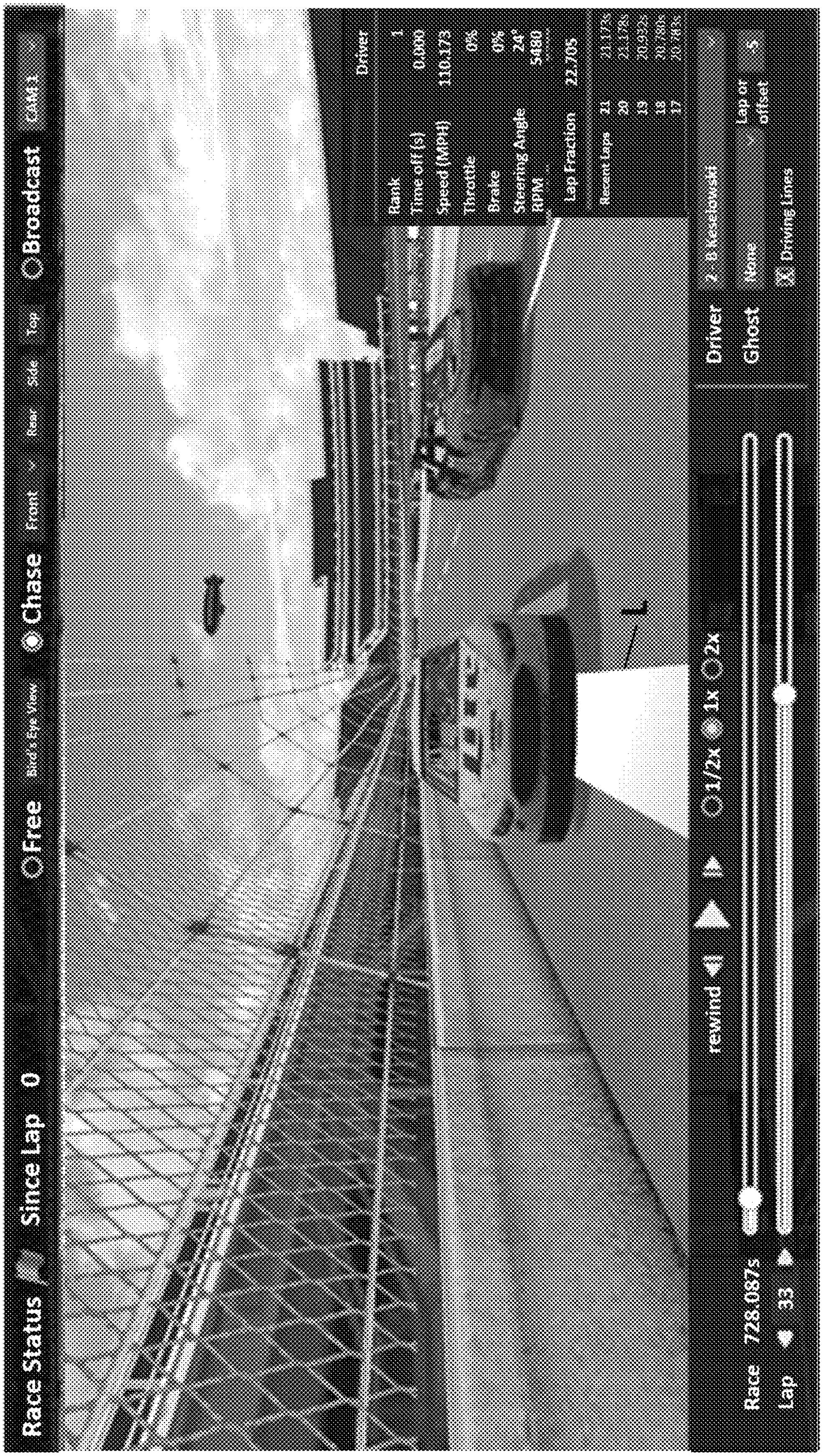
FIG. 4 displays a driver/vehicle in a NASCAR event at lap 33 in chase mode according to one embodiment of the present invention.

FIG. 4 displays a driver/vehicle in a NASCAR event at lap 33 in chase mode according to one embodiment of the present invention. The driver/vehicle of interest is No. 2 B. Keselowski, who ranks first at the moment in FIG. 4. FIG. 4 shows a front view of the driver/vehicle No. 2 B. Keselowski in chase mode, whose driving line is depicted as L. The driver/vehicle of interest is at 33.543 laps, the speed is 110.173 mph, the percentage of throttle is 0, the percentage of brake is 0, the steering angle is 24°, and the RPM is 5480. The time spent on the last five laps (laps 28, 29, 30, 31, and 32) is also displayed for the driver/vehicle respectively.

Figure 5:
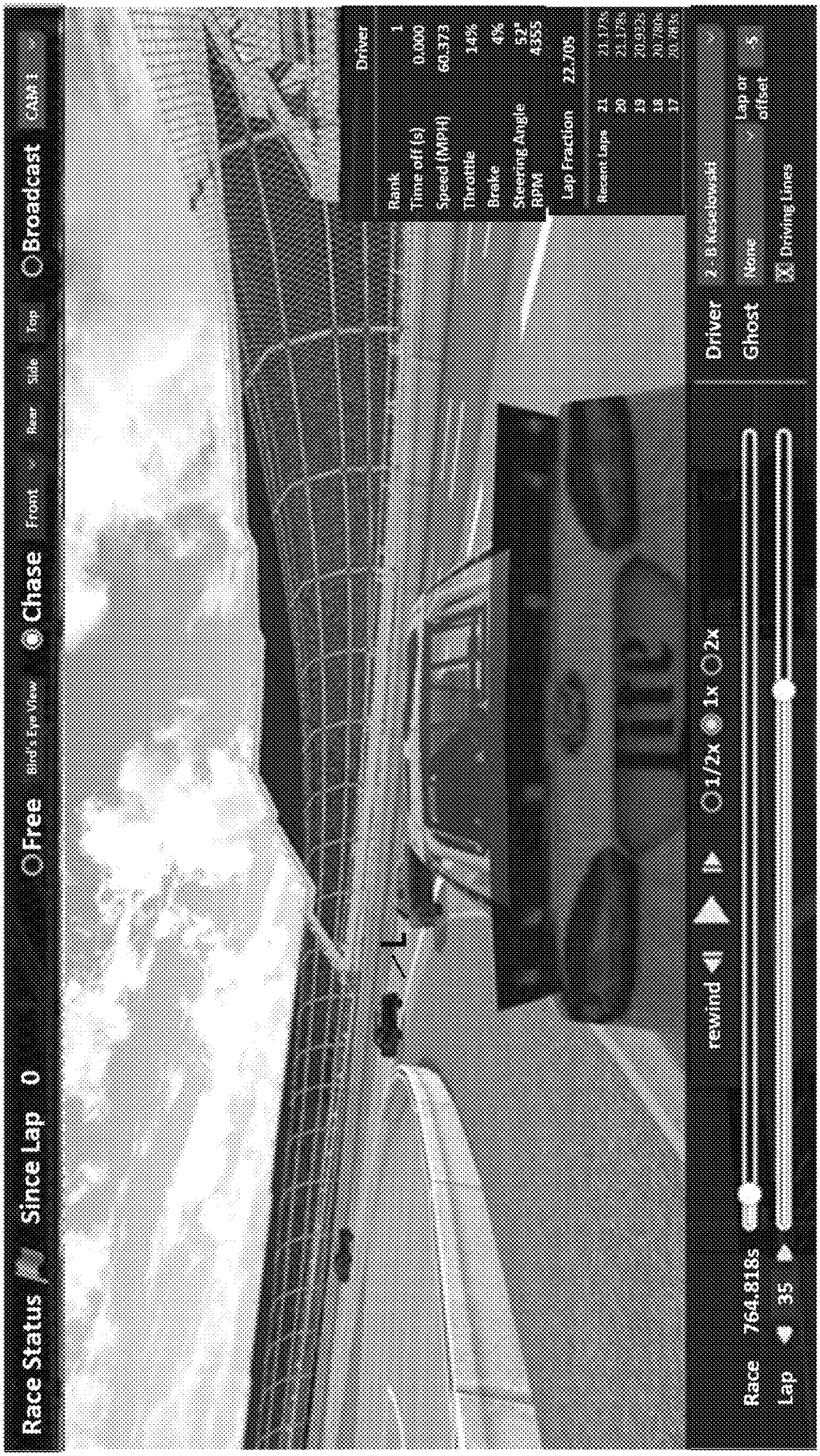
FIG. 5 displays a driver/vehicle in a NASCAR event at lap 35 in chase mode according to one embodiment of the present invention.

FIG. 5 displays a driver/vehicle in a NASCAR event at lap 35 in chase mode according to one embodiment of the present invention. The driver/vehicle of interest is No. 2 B. Keselowski, who ranks first at the moment in FIG. 5. The driver/vehicle of interest has traveled 35.257 laps, the speed is 60.373 mph, the percentage of throttle is 14%, the percentage of brake is 4%, the steering angle is 52°, and the RPM is 4385. The time spent on the last five laps (laps 30, 31, 32, 33 and 34) is also displayed for the driver/vehicle respectively. FIG. 5 shows a front view of the driver/vehicle No. 2 B. Keselowski in chase mode, whose driving line is depicted as L.

Figure 6:
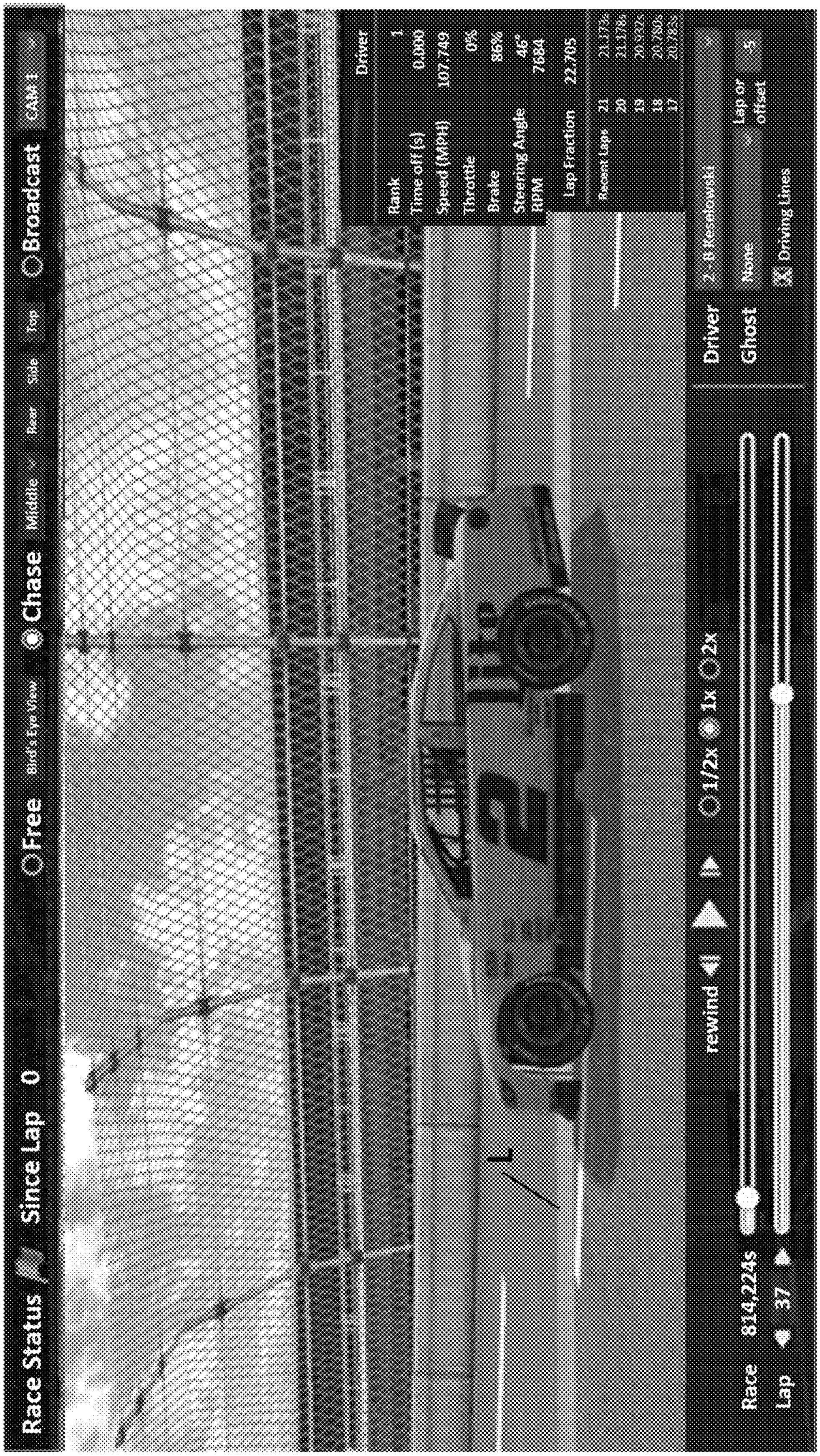
FIG. 6 displays a driver/vehicle in a NASCAR event at lap 37 in chase mode according to one embodiment of the present invention.

FIG. 6 displays a driver/vehicle in a NASCAR event at lap 37 in chase mode according to one embodiment of the present invention. The driver/vehicle of interest is No. 2 B. Keselowski, who ranks first at the moment in FIG. 6. The driver/vehicle of interest has traveled 37.618 laps, the speed is 107.749 mph, the percentage of throttle is 0%, the percentage of brake is 86%, the steering angle is 46°, and the RPM is 7584. The time spent on the last five laps (laps 32, 33, 34, 35 and 36) is also displayed for the driver/vehicle of interest respectively. FIG. 6 shows a middle view of the driver/vehicle No. 2 B. Keselowski in chase mode, whose driving line is depicted as L.

Figure 7:
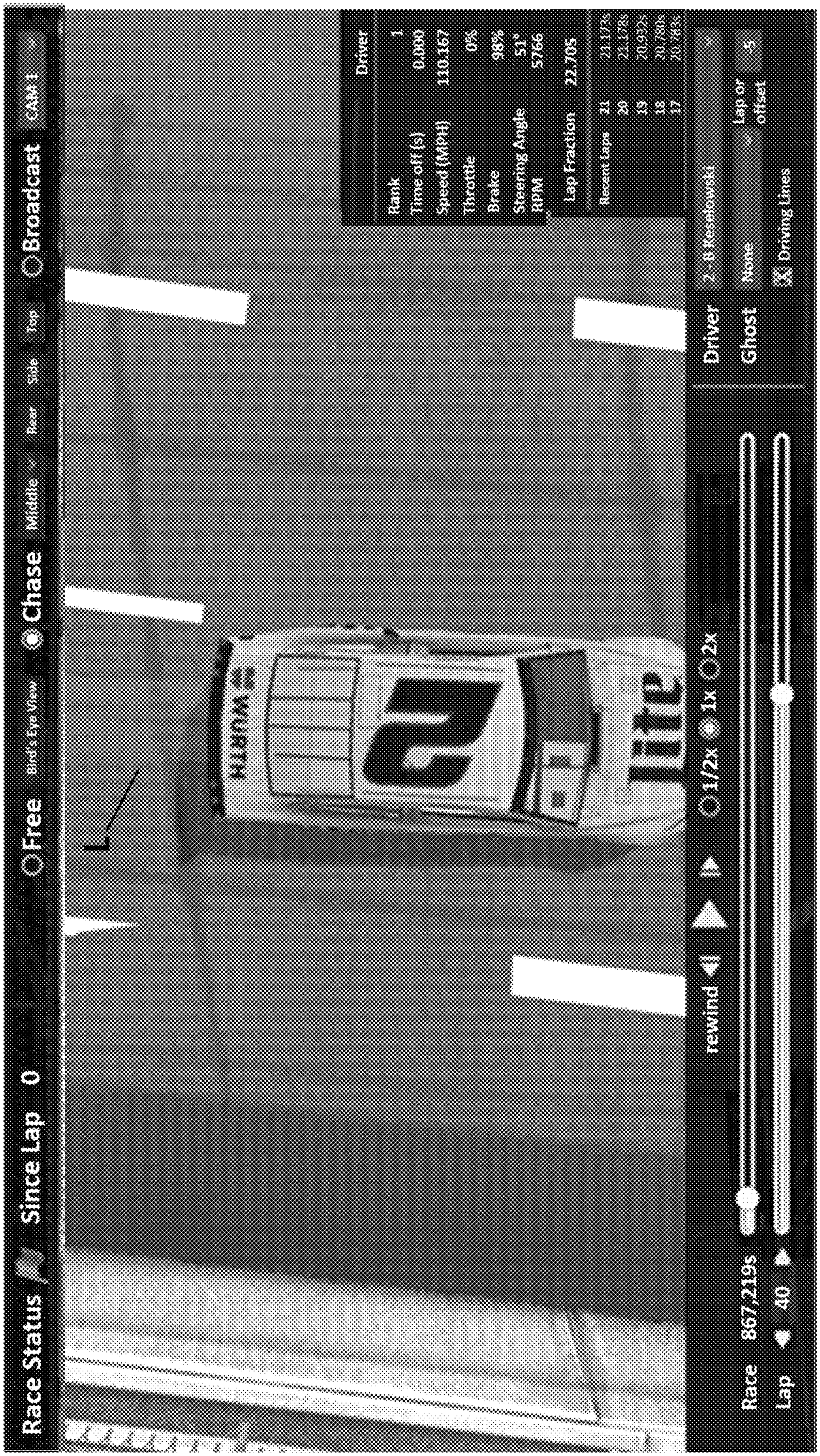
FIG. 7 displays a driver/vehicle in a NASCAR event at lap 40 in chase mode according to one embodiment of the present invention.

FIG. 7 displays a driver/vehicle in a NASCAR event at lap 40 in chase mode according to one embodiment of the present invention. The driver/vehicle of interest is No. 2 B.

Keselowski, who ranks first at the moment in FIG. 7. The driver/vehicle of interest has traveled 40.103 laps, the speed is 110.167 mph, the percentage of throttle is 0%, the percentage of brake is 98%, the steering angle is 51°, and the RPM is 5756. The time spent on the last five laps (laps 35, 36, 37, 38 and 39) is also displayed for the driver/vehicle respectively. FIG. 7 shows a middle view of the driver/vehicle No. 2 B. Keselowski in chase mode, whose driving line is depicted as L.

Figure 8:
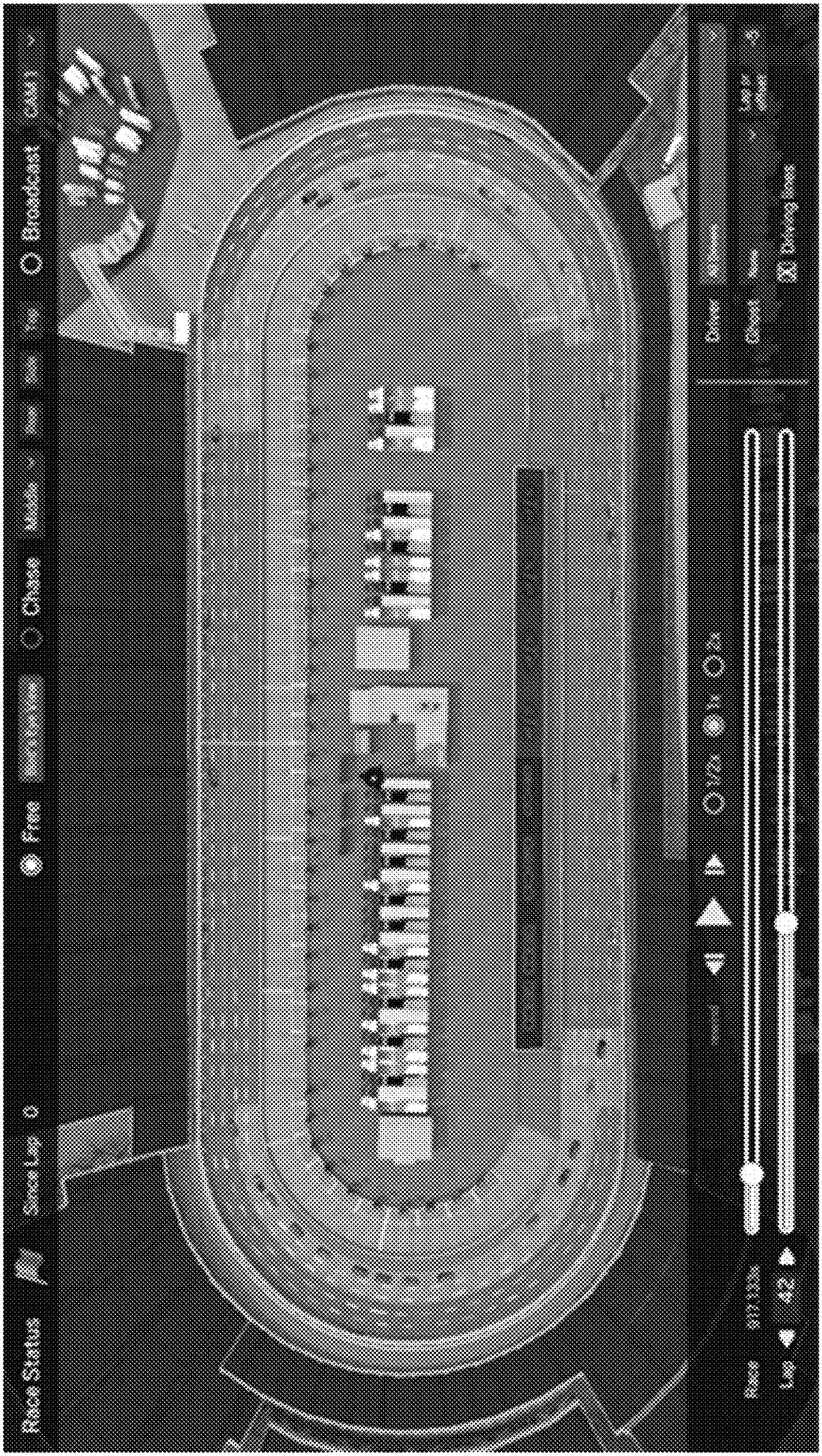
FIG. 8 displays a bird's eye view of a NASCAR event at lap 42 in free mode according to one embodiment of the present invention.

FIG. 8 displays a bird's eye view of a NASCAR event at lap 42 in free mode according to one embodiment of the present invention. All the drivers/vehicles are displayed on the track of the NASCAR event in a bird's eye view.

Figure 9:
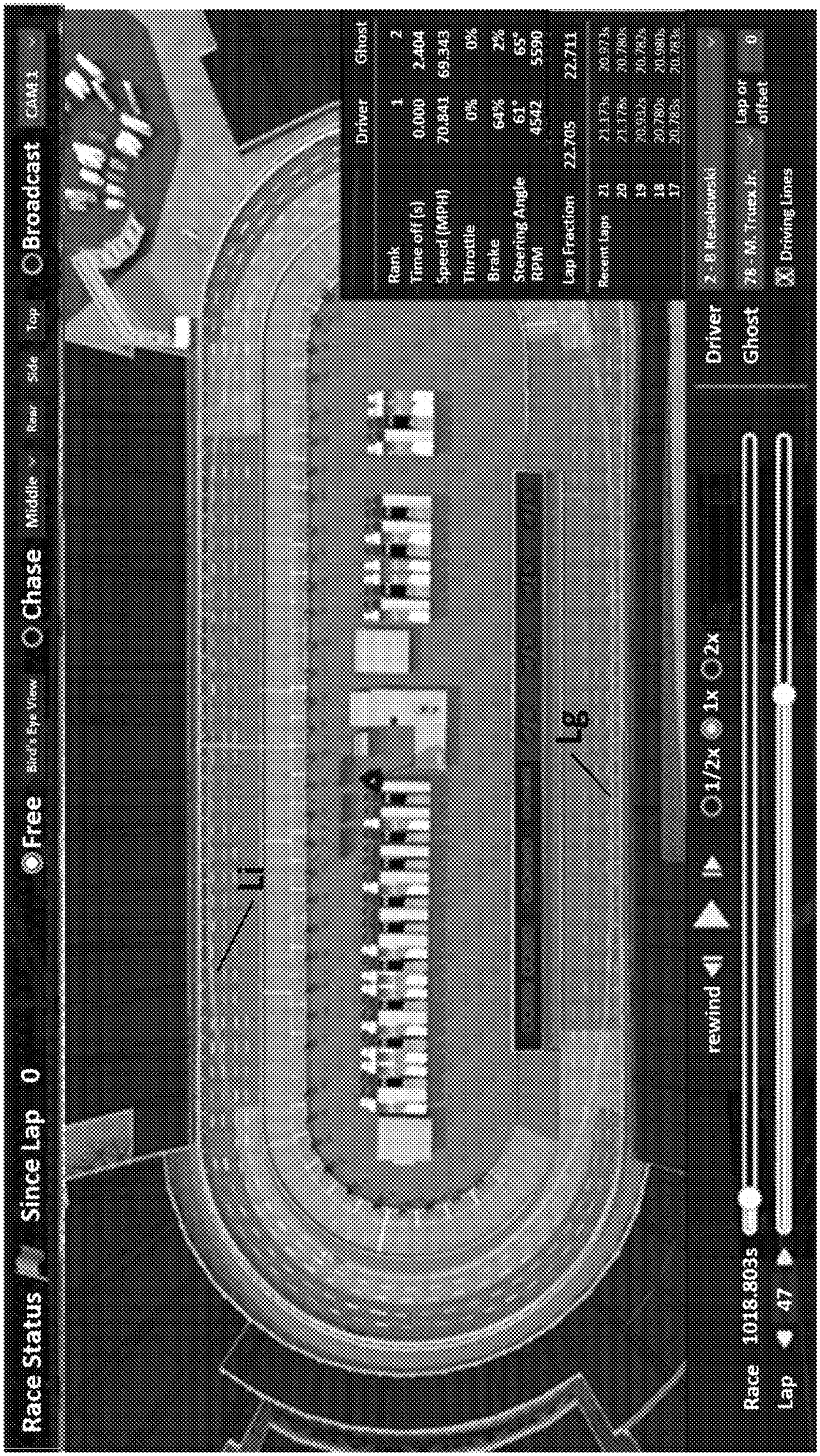
FIG. 9 displays a comparison of two drivers/vehicles in a NASCAR event at lap 47 in free mode according to one embodiment of the present invention.

FIG. 9 displays a comparison of two drivers/vehicles in a NASCAR event at lap 47 in free mode according to one embodiment of the present invention. Two drivers/vehicles are displayed on the track of the NASCAR event in a bird's eye view. The driver/vehicle of interest is No. 2 B. Keselowski, and the ghost driver/vehicle is No. 78 M. Truex Jr. The driver/vehicle of interest No. 2 B. Keselowski ranks first and the ghost driver/vehicle No. 78 M. Truex Jr. ranks third in the same NASCAR event at the moment displayed in FIG. 9. The driver/vehicle of interest has traveled 47.214 laps, the speed is 70.841 mph, the percentage of throttle is 0%, the percentage of brake is 64%, the steering angle is 61° and the RPM is 4842. The ghost driver/vehicle has traveled 47.209 laps, the speed is 69.343 mph, the percentage of throttle is 0%, the percentage of brake is 2%, the steering angle is 65°, and the RPM is 5590. The time off with reference to the driver of interest is 2.404 s. The driving lines for the driver and the ghost driver are depicted as Li and Lg in FIG. 9. The time spent on the last five laps (laps 42, 43, 44, 45 and 46) is also displayed for the driver/vehicle of interest and the ghost driver/vehicle respectively.

Figure 10:
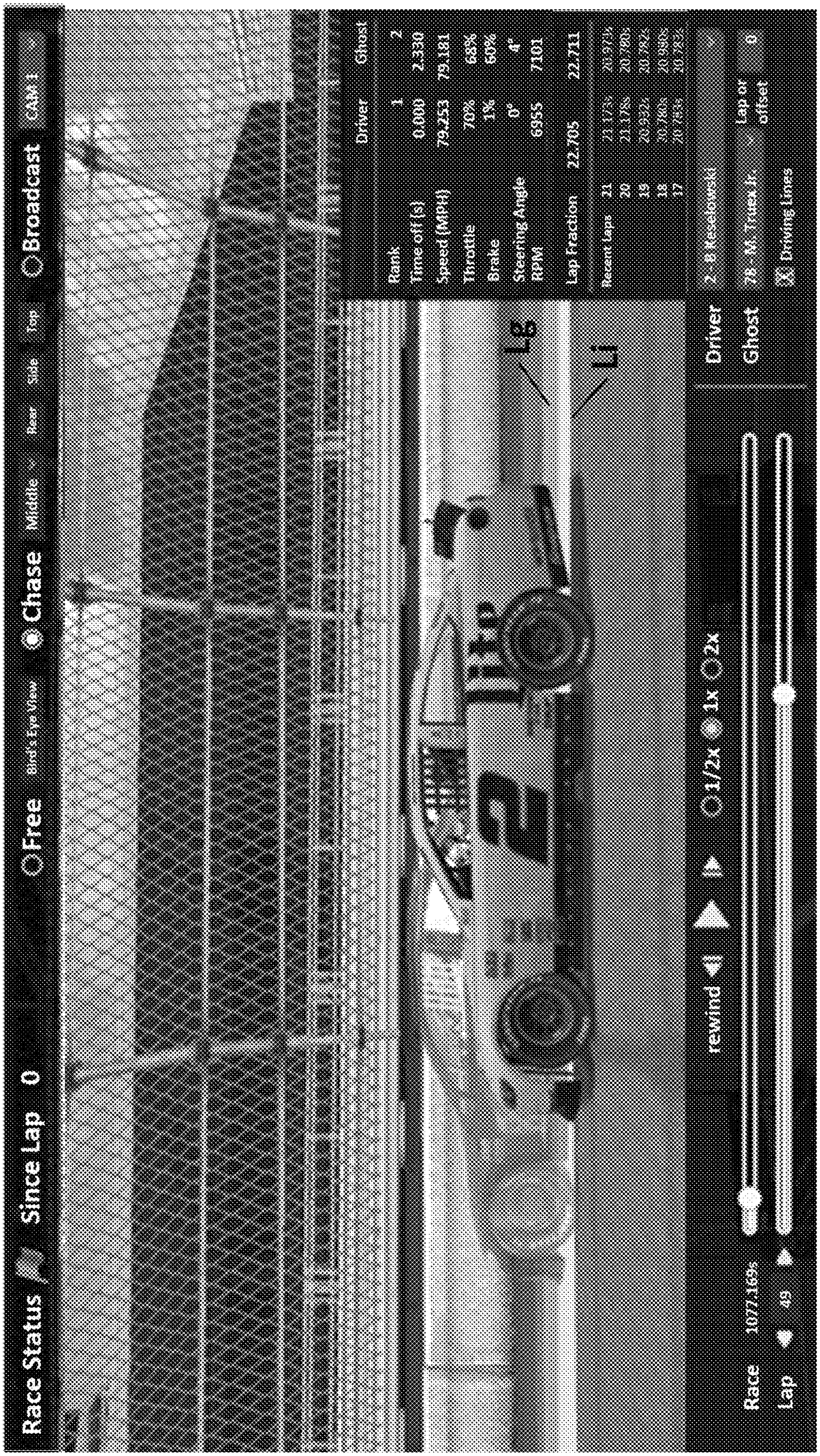
FIG. 10 displays a comparison of two drivers/vehicles in a NASCAR event at lap 49 in chase mode according to one embodiment of the present invention.

FIG. 10 displays a comparison of two drivers/vehicles in a NASCAR event at lap 49 in chase mode according to one embodiment of the present invention. The driver of interest No. 2 B. Keselowski currently ranks first and the driver No. 78 M. Truex Jr. currently ranks third in the same NASCAR event at the moment displayed in FIG. 10. The driver/vehicle of interest has traveled 49.892 laps, the speed is 79.253 mph, the percentage of throttle is 76%, the percentage of brake is 1%, the steering angle is 0° and the RPM is 6985. The ghost driver/vehicle has traveled 49.894 laps, the speed is 79.181 mph, the percentage of throttle is 68%, the percentage of brake is 60%, the steering angle is 4°, and the RPM is 7101. The time off compared to the driver of interest is 2.330 s. FIG. 10 shows a middle view of the two drivers/vehicles in chase mode, the driving line for the driver/vehicle of interest as Li and the driving line for the ghost driver as Lg. The time spent on the last five laps (laps 42, 43, 44, 45 and 46) is also displayed for the driver and the ghost driver respectively.

Figure 11:
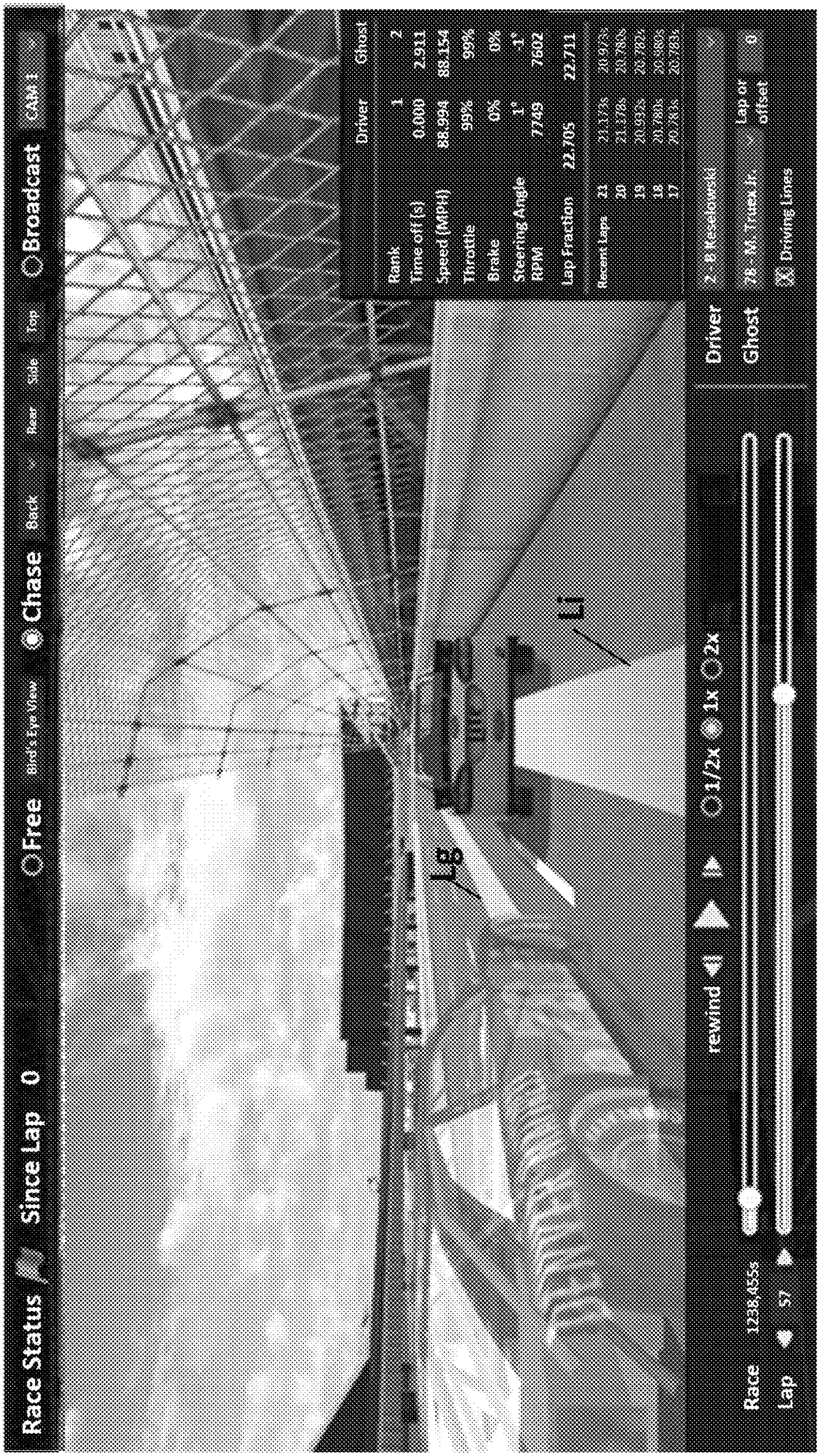
FIG. 11 displays a comparison of two drivers/vehicles in a NASCAR event at lap 57 in chase mode according to one embodiment of the present invention.

FIG. 11 displays a comparison of two drivers/vehicles in a NASCAR event at lap 57 in chase mode according to one embodiment of the present invention. FIG. 11 provides a back view for the driver/vehicle of interest No. 2 B. Keselowski and the ghost driver/vehicle No. 78 M. Truex Jr. in chase mode. The driver/vehicle of interest ranks first and the ghost driver/vehicle ranks third in the same NASCAR event at the moment displayed in FIG. 11. The driver/vehicle of interest has traveled 57.432 laps, the speed is 88.994 mph, the percentage of throttle is 99%, the percentage of brake is 0%, the steering angle is 1° and the RPM is 7749. The ghost driver/vehicle has traveled 57.426 laps, the speed is 88.154 mph, the percentage of throttle is 99%, the percentage of brake is 0%, the steering angle is −1°, and the RPM is 7502. The time off with reference to the driver/vehicle of interest is 2.911 s. The driving lines for the driver/vehicle of interest and the ghost driver/vehicle are depicted as Li and Lg in FIG. 11. The time spent on the last five laps such as laps 52, 53, 54, 55 and 56 is also displayed for the driver/vehicle and the ghost driver/vehicle respectively.

The detailed description of the present invention includes various techniques for enhancing a video broadcast of a live event, which are described in the following issued patents, by common assignee SportsMEDIA Technology Corp.: U.S. Pat. Nos. 8,558,883, 8,457,392, 8,456,527, 8,401,304, 8,385,658, 8,253,799, 8,077,981, and 8,016,653, each of which is incorporated by reference herein in its entirety.

The present invention described above is applicable to other sporting events, such as golf, football, basketball, rugby, baseball, soccer, hockey, cricket, volleyball, tennis, horse racing, running race, swimming, boxing, mixed martial arts, and any other sports event or competitive event(s). Also, the systems and methods of the present invention apply to professional sports events, amateur sports events, unofficial or unsanctioned events or activities, individual competitive activities, online gaming events, etc.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system of video enhancement, comprising:

a server platform in network communication with at least one input capture device for a first event and at least one user device;

wherein the at least one input capture device is operable to collect and transmit input data relating to the first event to the server platform;

wherein the server platform is operable to access historical data from at least one historical event;

wherein the server platform is operable to overlay a graphical element representing an element for comparison on video images of an element of interest in the first event;

wherein the at least one user device is operable to display the graphical element on the video images of the element of interest;

wherein data relating to the first event and the at least one historical event is synchronized;

wherein the at least one user device is further operable to display a line indicating an average trajectory of the element of interest or the element for comparison; and wherein the at least one user device is operable to display the element of interest and the element for comparison in different modes.

2. The system of claim 1, wherein the server platform is cloud-based.

3. The system of claim 1, wherein the input data comprises video data for the first event.

4. The system of claim 1, wherein the server platform is operable to update the line based on changes in position of the element of interest or the element for comparison.

5. The system of claim 1, wherein the input data is associated with time codes, and wherein the server platform is operable to synchronize the input data along a timeline.

6. The system of claim 1, wherein the element for comparison is an element different from the element of interest in the at least one historical event.

7. The system of claim 1, wherein the element for comparison is the element of interest in the at least one historical event.

8. The system of claim 1, wherein the at least one user device is operable to select the element of interest and the element for comparison via an interactive graphical user interface (GUI).

9. The system of claim 1, wherein the element of interest is a first contestant and the element for comparison is a second contestant from the at least one historical event.

10. The system of claim 1, wherein the at least one user device is operable to display the first event in a front view, a back view, and/or a middle view of the element of interest in the first event.

11. The system of claim 1, wherein the at least one user device is operable to display the first event in broadcast mode including at least one camera view of the first event.

12. A system of video enhancement, comprising:

a server platform in network communication with at least one input capture device for a first event and at least one user device;

wherein the at least one input capture device is operable to collect and transmit input data relating to the first event to the server platform;

wherein the server platform is operable to access historical data for at least one historical event;

wherein the server platform is operable to overlay a graphical element representing an element for comparison on video images of an element of interest in the first event;

wherein the at least one user device is operable to display the graphical element on the video images of the element of interest;

wherein the at least one user device is further operable to display statistical data for the element of interest and the element for comparison;

wherein data relating to the first event and the at least one historical event is synchronized;

wherein the at least one user device is further operable to display a line indicating an average trajectory of the element of interest or the element for comparison based on the data relating to the first event and the at least one historical event; and wherein the at least one user device is operable to display the element of interest and the element for comparison in different modes.

13. The system of claim 12, wherein the element of interest is a first contestant and the element for comparison is a second contestant.

14. The system of claim 12, wherein the first event is an auto racing event.

15. The system of claim 12, wherein the element of interest is a first driver and a first vehicle and the element for comparison is a second driver and a second vehicle.

16. A method of video enhancement, comprising:

providing a server platform in network communication with at least one input capture device for a first racing event and at least one user device;

the at least one input capture device collecting and transmitting input data relating to the first racing event to the server platform;

the server platform analyzing the input data, thereby creating analyzed data;

the server platform accessing historical data for at least one historical event stored in a database;

the server platform comparing driver performances in the first racing event and the at least one historical event based on the analyzed data and the historical data;

the server platform overlaying a graphical element representing a driver and vehicle for comparison on video images of a driver and vehicle of interest in the first racing event;

the server platform synchronizing data relating to the first racing event and the at least one historical event;

the at least one user device displaying the graphical element on the video images of the driver and vehicle of interest;

the at least one user device displaying a first line indicating an average trajectory of the driver and vehicle of interest and a second line indicating an average trajectory of the driver and vehicle for comparison.

17. The method of claim 16, wherein the input data comprises a speed, a percentage of throttle, a percentage of brake, a steering angle, and revolutions per minute (RPM).

18. The method of claim 16, further comprising the at least one user device simultaneously displaying a view of the first racing event in broadcast mode, wherein the view of the first racing event in broadcast mode does not include the graphical element representing the driver and vehicle for comparison.

19. The method of claim 16, further comprising the at least one user device displaying a bird's-eye view of the first racing event.

20. The method of claim 16, wherein the driver and vehicle of interest is a first contestant and the driver and vehicle for comparison is the first contestant from the at least one historical event.

* * * * *